United States Patent [19]

Patel

[11] Patent Number: 5,409,778
[45] Date of Patent: Apr. 25, 1995

[54] PRIMED, ABRASION RESISTANT THERMOPLASTIC ARTICLES AND METHOD FOR THEIR PREPARATION

[75] Inventor: Gautam A. Patel, Clifton Park, N.Y.

[73] Assignee: General Electric Company, Schenectady, N.Y.

[21] Appl. No.: 199,920

[22] Filed: Feb. 22, 1994

[51] Int. Cl.⁶ ............................................. B32B 27/30
[52] U.S. Cl. ................................. 428/412; 427/379; 427/387; 427/393.5; 427/412.1; 428/451; 428/520; 428/522; 428/908.8
[58] Field of Search ...................... 427/379, 387, 393.5, 427/412.1; 428/412, 413, 451, 522, 520, 908.8

[56] References Cited

U.S. PATENT DOCUMENTS

| | | | |
|---|---|---|---|
| 4,382,109 | 5/1983 | Olson et al. | 428/331 |
| 5,041,313 | 8/1991 | Patel | 427/379 |
| 5,045,396 | 9/1991 | Lin et al. | 428/412 |

Primary Examiner—D. S. Nakarani
Attorney, Agent, or Firm—William H. Pittman

[57] ABSTRACT

Improved adhesion of abrasion-resistant top coats such as silicone hardcoats to thermoplastic (preferably polycarbonate) surfaces is obtained by employing as a primer a mixture of poly(methyl methacrylate) with a copolymer of methyl methacrylate and at least one other alkyl acrylate, said copolymer having a glass transition temperature up to about 75° C. The improvement in adhesion is particularly noticeable for dip-coated and flow-coated substrates having top coats of variable thickness.

16 Claims, No Drawings

PRIMED, ABRASION RESISTANT THERMOPLASTIC ARTICLES AND METHOD FOR THEIR PREPARATION

BACKGROUND OF THE INVENTION

This invention relates to abrasion-resistant thermoplastic articles and a method for their preparation. More particularly, it relates to the use of an improved primer in the fabrication of such articles.

Transparent plastics are widely used, particularly in sheet form, as substitutes for glass. They are advantageous in that they do not shatter or at least are more resistant than glass to shattering. Typical thermoplastics employed for this purpose are polycarbonates and poly(methyl methacrylate).

Because these thermoplastics are subject to surface scratching and abrasion, degrading their transparency, they are traditionally provided with a silicone top coat, hereinafter sometimes designated "hardcoat", to improve abrasion resistance and also weather resistance. Hardcoats are typically produced by flow coating or dip coating the thermoplastic article with a liquid alkylalkoxy silane, preferably with silica suspended therein, followed by thermal curing.

The adhesion of hardcoats to thermoplastic surfaces, especially of polycarbonate, is frequently deficient unless a primer is first applied to the thermoplastic surface. Typical primers are solutions of poly(methyl methacrylate) in organic solvents. Such solutions may also be applied by dip coating or flow coating, followed by removal of the solvent by air drying and in turn by hardcoat application. The thickness of the primer coating is typically about 0.2–1.0 micron.

It will be apparent that dip coating or flow coating of a thermoplastic sheet, generally conducted with the sheet held in a vertical position, will result in a primer or hardcoat layer with considerable variation in thickness from top to bottom. The coating liquid flows downward due to gravity, and therefore the coating thickness is substantially greater at the bottom of the sheet than at the top. Thus, a silicone hardcoat may have a thickness in the range of 3–4 microns at the top and 6–8 microns at the bottom of the coated sheet.

In regions in which the thickness of the hardcoat is less than about 5 microns, it is frequently found that adhesion to a poly(methyl methacrylate) primer is poor. For example, catastrophic failure may be observed in a crosshatch tape adhesion test (ASTM method D3359). On the other hand, adhesion of a hardcoat with a thickness of 5 microns or greater to the same primer may be adequate. Hardcoat adhesion is generally independent of the thickness of the primer layer, but variation in adhesion depending on hardcoat thickness is, of course, undesirable.

SUMMARY OF INVENTION

The present invention is based on the discovery of a genus of primer compositions showing excellent adhesion to silicone hardcoats applied thereto, regardless of the thickness of the hardcoat in a given region. Thus, the employment of dip coating or flow coating with consistency of adhesion results from one region of a thermoplastic sheet to another is possible.

In one of its aspects, the invention includes resinous articles comprising a thermoplastic substrate, a primer layer and an adherent cured silicone top coat, said primer layer comprising a mixture of (A) poly(methyl methacrylate) and (B) about 5–35% by weight, based on total components A and B, of at least one copolymer of methyl methacrylate with at least one other ester of acrylic acid or methacrylic acid, said copolymer having a glass transition temperature up to about 75° C.

Another aspect of the invention is a method for producing an abrasion-resistant thermoplastic resinous article which comprises:

priming a thermoplastic substrate with a primer layer comprising a mixture of (A) poly(methyl methacrylate) and (B) about 5–35% by weight, based on the combination of components A and B, of at least one copolymer of methyl methacrylate with at least one other ester of acrylic acid or methacrylic acid, said copolymer having a glass transition temperature up to about 75° C.;

applying a silicone top coat to the primed substrate; and curing said silicone top coat.

DETAILED DESCRIPTION; PREFERRED EMBODIMENTS

The substrate employed according to the present invention may be any thermoplastic substrate to which it is desired to apply an abrasion-resistant top coat. Transparent substrates such as polycarbonates and poly(methyl methacrylate), especially the former, are often preferred.

The polycarbonates comprise structural units of the formula

wherein $R^1$ is a divalent organic radical. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R1 radicals are hydrocarbon radicals.

Preferably at least about 60% and more preferably at least about 80% of the total number of $R^1$ values in the cyclic oligomer mixtures, and most desirably all of said $R^1$ values, are aromatic. The aromatic R1 radicals preferably have the formula

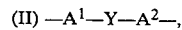

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o-or m-phenylene or one o-or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The abrasion- and weather-resistant silicone hardcoat employed according to the invention is a conventional material disclosed in many publications and patents, including U.S. Pat. Nos. 4,419,405 and 4,624,870 which are incorporated herein by reference. Suitable hardcoats include partial hydrolysis and condensation products of substituted silanes in which the substituents include one or more alkyl or aryl groups and one or more alkoxy or acyloxy groups. Preferred alkyl, alkoxy and acyloxy groups are methyl, methoxy and acetate, respectively. Upon hydrolysis, such compounds are converted to silanols which condense to form organopolysiloxanes.

Particularly preferred are the partial hydrolysis and condensation products of alkyl-or aryltrialkoxysilanes, especially methyltrimethoxysilanes, usually combined with silica and especially colloidal silica as well as such other materials as flow control and ultraviolet screening agents. Such products are typically prepared by heating the alkyltrialkoxysilane in the presence of water and a hydrolysis catalyst, preferably a mineral acid such as hydrochloric acid or an acetoxy reagent such as acetic acid or triacetoxysilane. Hydrolysis and condensation result in the formation of siloxanols. The condensate is then applied to the substrate and cured, typically at a temperature in the range of about 50°–135° C.

The crux of the present invention is the use as a primer of a mixture of poly(methyl methacrylate) and at least one copolymer of methyl methacrylate with at least one other ester of acrylic acid or methacrylic acid, said other ester comprising about 5–35% and preferably about 10–25% by weight of total components A and B. Suitable other esters include $C_{1-10}$ alkyl (for example, ethyl, butyl or 2-ethylhexyl) acrylates and methacrylates. Such copolymers are available as commercial products, illustrated by those sold by Rohm and Haas Co. under the tradenames ACRYLOID B-82, ACRYLOID B-48N and ACRYLOID B-44. They are characterized by a glass transition temperature up to about 75° C., preferably up to about 65° C. This is in contrast to poly(methyl methacrylate), which generally has a glass transition temperature in the range of about 95°–100° C.

The polymers employed in the primer are generally dissolved in one or more suitable organic solvents, illustrated by glycol ethers and ketones such as ethylene glycol monomethyl ether, propylene glycol monomethyl ether and diacetone alcohol, to a concentration in the range of about 1–5% by weight. Other materials, such as absorbers of ultraviolet radiation, may also be present. The primer solution is then applied to the substrate by conventional methods, most often flow coating or dip coating, typically to a thickness on the order of 0.2–1.0 micron. Following application, the primed substrate is usually allowed to air dry for a few minutes and then baked at a temperature in the range of about 100°–150° C. to remove solvents.

The primed substrate is then treated with the hardcoat composition, usually also be flow coating or dip coating, and again air dried, after which the hardcoat is cured. It will be apparent that flow or dip coating operations will, as noted hereinabove, produce coatings varying in thickness from the top to the bottom of the substrate. The advantage of the present invention is that variation in hardcoat thickness is not accompanied by substantial differences in adhesion of the hardcoat to the primed substrate.

The invention is illustrated by the following examples. All parts are by weight.

EXAMPLES 1–7

Primer compositions were prepared by blending various proportions of a commercially available poly(methyl methacrylate) with three commercially available methyl methacrylate-alkyl (meth)acrylate copolymers having the indicated glass transition temperatures: AORYLOID B-82, 35° C.; ACRYLOID B-48N, 50° C.; and ACRYLOID B-44, 60° C. The two polymers and a commercially available ultraviolet absorbing agent were dissolved in a mixture of 85 parts of propylene glycol monomethyl ether and 15 parts of diacetone alcohol, with heating if necessary to effect complete dissolution, and the resulting solutions were flow coated onto 102×152×3.2 mm. bisphenol A polycarbonate panels. The panels were air dried vertically under ambient conditions for 15 minutes, thermally dried in an air circulated convection oven for 15 minutes at 130° C. and allowed to cool to room temperature.

The primed panels were flow coated with a commercial silicone hardcoat material ("AS-4000" of GE Silicones) containing colloidal silica and an ultraviolet absorber, after which they were air dried for 15 minutes and cured at 130° C. for 60 minutes. The thicknesses of the hardcoat layers were found to be about 3 microns at the top and about 6 microns at the bottom of each panel.

The adhesion of the hardcoats to the primed panels was evaluated by ASTM method D3359, using a cross cut pattern of one hundred 1-mm. squares. Partial or complete removal of any square or hardcoat pickup along the edges constituted a failure. Panels which passed the initial adhesion test were subjected to water immersion for 20 days at 65° C. or until failure when similarly tested.

The results are given in Table I, in which the poly(methyl methacrylate), copolymer and UV absorber proportions are given in parts. Five controls are listed for comparison in Table II.

TABLE I

|  | 1 | 2 | 3 | 4 | 5 | 6 | 7 |
|---|---|---|---|---|---|---|---|
| Poly(methyl methacrylate) | 1.9 | 1.8 | 1.5 | 1.9 | 1.8 | 1.5 | 1.5 |
| ACRYLOID B-82 copolymer | 0.1 | 0.2 | 0.5 | — | — | — | — |
| ACRYLOID B-48N copolymer | — | — | — | 0.1 | 0.2 | 0.5 | — |
| ACRYLOID B-44 copolymer | — | — | — | — | — | — | 0.5 |
| Cyanoacrylate UV absorber | 0.5 | 0.5 | 0.5 | 0.5 | 0.5 | 0.5 | 0.5 |
| Adhesion, initial | Pass | Pass | Pass | Pass | Pass | Pass | Pass |
| Water immersion, days to failure | 7 | None | None | 12 | None | None | None |

TABLE II

|  | A | B | C | Control D | E |
|---|---|---|---|---|---|
| Poly(methyl methacrylate) | 2 | 2 | 2 | — | — |
| ACRYLOID B-82 copolymer | — | — | — | 2 | — |
| ACRYLOID B-48N copolymer | — | — | — | — | 2 |
| Cyanoacrylate UV absorber | — | 0.5 | — | 0.5 | 0.5 |
| Benzophenone UV absorber | — | — | 0.25 | — | — |
| Benzotriazole UV absorber | — | — | 0.25 | — | — |
| Adhesion, initial | Fail | Fail | Fail | Pass | Pass |
| Water immersion, days to failure | — | — | — | 6 | 6 |

It will be apparent from the results in the tables that priming of the polycarbonate panels according to the present invention resulted in significantly better adhesion than priming with poly(methyl methacrylate) alone. Further, adhesion was initially equivalent to that shown by copolymer-primed panels, and was either marginally or substantially better after water immersion. This was particularly true for primers in which the copolymer comprised at least 10% of total components A and B, as in Examples 2, 3 and 5-7. A comparison of Controls B and C indicates that the identity of the UV absorber can be expected to have little or no effect on adhesion.

The panels of Examples 1-7 were also subjected to accelerated weathering tests consisting of cycles of 8 hours of exposure to ultraviolet light provided by UV-B FS-40 lamps in a QUV weatherometer at 70° C., followed by 4 hours of exposure to moisture in the dark at 50° C. No adhesion loss was observed after 2000 hours over the entire surface of the panel. Thus, the invention provides durable adhesion and weather resistance between the hardcoat and primed substrate when exposed to moisture, thermal cycling and ultraviolet light.

What is claimed is:

1. A transparent resinous article comprising a thermoplastic substrate, a primer layer and an adherent cured silicone top coat, said primer layer comprising a mixture of (A) poly(methyl methacrylate) and (B) about 5-35% by weight, based on total components A and B, of at least one copolymer of methyl methacrylate with at least one other ester of acrylic acid or methacrylic acid, said copolymer having a glass transition temperature up to about 75° C.

2. An article according to claim 1 wherein the substrate is polycarbonate or poly(methyl methacrylate).

3. An article according to claim 2 wherein the substrate is polycarbonate.

4. An article according to claim 3 wherein the substrate is bisphenol A polycarbonate.

5. An article according to claim 3 wherein the top coat is a hydrolysis and condensation product of methyltrimethoxysilane.

6. An article according to claim 3 wherein component B comprises about 10-25% by weight of total components A and B.

7. An article according to claim 3 wherein the glass transition temperature of component B is up to about 65° C.

8. An article according to claim 3 wherein the primer layer also contains at least one absorber of ultraviolet radiation.

9. A method for producing a transparent abrasion-resistant thermoplastic resinous article which comprises:
   priming a thermoplastic substrate with a primer layer comprising a mixture of (A) poly(methyl methacrylate) and (B) about 5-35% by weight, based on the combination of components A and B, of at least one copolymer of methyl methacrylate with at least one other ester of acrylic acid or methacrylic acid, said copolymer having a glass transition temperature up to about 75° C.;
   applying a silicone top coat to the primed substrate; and
   curing said silicone top coat.

10. A method according to claim 9 wherein the substrate is polycarbonate or poly(methyl methacrylate).

11. A method according to claim 10 wherein the substrate is polycarbonate.

12. A method according to claim 11 wherein the substrate is bisphenol A polycarbonate.

13. A method according to claim 10 wherein the top coat is a hydrolysis and condensation product of methyltrimethoxysilane.

14. A method according to claim 10 wherein component B comprises about 10-25% by weight of total components A and B.

15. A method according to claim 10 wherein the glass transition temperature of component B is up to about 65° C.

16. A method according to claim 10 wherein the primer layer also contains at least one absorber of ultraviolet radiation.

* * * * *